United States Patent [19]
Hüllen et al.

[11] 4,343,644
[45] Aug. 10, 1982

[54] APPARATUS FOR MAKING HOLLOW GLASSWARE AND METHOD OF OPERATING THE APPARATUS

[75] Inventors: Helmut Hüllen; Werner-Dieter Knoth, both of Essen, Fed. Rep. of Germany

[73] Assignee: Veba-Glas AG, Essen, Fed. Rep. of Germany

[21] Appl. No.: 214,699

[22] Filed: Dec. 9, 1980

[30] Foreign Application Priority Data

Dec. 14, 1979 [DE] Fed. Rep. of Germany ....... 2950280

[51] Int. Cl.³ ........................... C03B 9/36; C03B 9/40
[52] U.S. Cl. ........................................ 65/241; 65/260; 65/265
[58] Field of Search ................... 65/81, 241, 260, 264, 65/265

[56] References Cited

U.S. PATENT DOCUMENTS 1,080,168 12/1913 Rau ....................................... 65/264
1,859,230 5/1932 Canfield ............................ 65/241 X

FOREIGN PATENT DOCUMENTS 2836628 2/1980 Fed. Rep. of Germany .

*Primary Examiner*—Arthur D. Kellogg
*Attorney, Agent, or Firm*—Karl F. Ross

[57] ABSTRACT

An apparatus for making hollow glassware has at least one preform provided adjacent a turntable rotatable about an upright axis and carrying at least two angularly spaced final molds. The turntable can rotate about this axis so as to orbit the final molds through a transfer position close to the perform and a takeout position angularly offset from the transfer position and remote from the preform. At least one arm is provided above the turntable and final molds and carries at least two respective mold heads. This arm is pivotal about the axis with the mold heads being vertically alignable and engageable with the respective final molds. The arm and mold heads can be pivoted about the axis independently of the turntable and a source of air at a pressure different from ambient is connected to the mold heads through the arm. A parison formed in the preform is deposited into one of the final molds in the transfer position and immediately thereafter one of the mold heads is brought into engagement with the one mold. Thereafter the one mold is orbited around into the takeout position while the mold head is carrying out the blow-molding operation, whereupon the mold head moves to the side to allow demolding of the finished workpiece.

8 Claims, 3 Drawing Figures

APPARATUS FOR MAKING HOLLOW GLASSWARE AND METHOD OF OPERATING THE APPARATUS

FIELD OF THE INVENTION

The present invention relates to an apparatus for making hollow glassware. More particularly this invention concerns a blow-molding apparatus and method of operating same.

BACKGROUND OF THE INVENTION

Hollow glassware can be made in a machine of the so-called I.S. type by extruding or otherwise inserting a gob of liquid glass into a preform where it is normally blown or pressed into a parison of concave shape. This parison is then transferred to a final mold where it is blow-molded, either by subjecting the parison internally to a superatmospheric pressure or externally to a subatmospheric pressure, into a finished article having the desired ultimate shape. Normally tongs or a neck ring transfer the parison from the preform to the final mold, and the same or another set of tongs or neck ring can be used to remove it from the final mold once the molding operation is complete.

In copending application Ser. No. 096,744 filed Nov. 23, 1979 (now U.S. Pat. No. 4,298,371) a method and apparatus are described wherein the parison is allowed to reside for a period sufficient to equalize its temperature before being blown into its ultimate shape. As the temperature of this parison equalizes and it is blown another final mold receives a parison that is meanwhile formed in the same premold. The two or more final molds associated with a given premold are mounted on a turntable for juxtaposition at a transfer position with the premold preparatory to each transfer step.

In this turntable system a so-called mold head is engaged with the top of the parison for closing it off and normally injecting pressurized air into the parison so as to press it against the inner walls of the final molds. Normally this mold head is provided at a fixed station adjacent the takeout station, so that the parison must be swung around to the takeout station before the mold head can be engaged with it and the blow-molding operation, which may employ either super- or subatmospheric pressure as mentioned above, can be carried out. As a result the system is somewhat slow in operation.

OBJECTS OF THE INVENTION

It is therefore an object of the present invention to provide an improved apparatus for molding hollow glassware.

Another object is to provide an improved method of operating such an apparatus.

Yet another object is to provide such an apparatus and method which allow a substantially faster cycling time.

SUMMARY OF THE INVENTION

These objects are attained according to the instant invention by providing in an apparatus of the above-described turntable type at least one arm above the turntable and final molds and carrying at least two respective mold heads. This arm is pivotal about the rotation axis of the turntable with the mold heads being vertically alignable with the respective final molds. Means is provided for pivoting the arm and the mold heads about the axis independently of the turntable. A source of air at a pressure different from ambient is connected to the mold heads, normally through the arm.

Thus it is possible in accordance with the instant invention to engage the mold head with the parison immediately after the neck ring or tongs have deposited the parison in one of the final molds in the transfer station. As the one mold with the parison is thereafter orbited about the turntable axis toward the takeout position the mold head can be effective for blow-molding of the parison. Before arriving at the takeout position or after arriving at the takeout position this one mold head can be moved out from above the completed piece of hollow glassware which can then be demolded in accordance with well-known procedures.

According to further features of this invention two such final molds and heads are provided diametrically opposite each other relative to the axis and the turntable is carried on a pivot tube that extends upwardly along the axis and that has an upper portion carrying the arm. This tubular pivot shaft forms a connection between the mold heads and the source of air under super- or subatmospheric pressure.

According to further features of this invention a pair of such preforms is provided along with two pairs of such final molds, and the arm carries two pairs of mold heads. Thus two workpieces can be acted on simultaneously. The support arm can be of one piece and simply carry such a pair of mold heads at each end, or can be two separate independently displaceable pieces.

In accordance with yet another feature of this invention the arms are not only pivotal about the upright axis of the turntable, but can also be raised and lowered for engagement of the respective heads with the respective final molds and their workpieces. The control and operation of these arms can be electrical, pneumatic, or hydraulic.

The apparatus and method according to the invention allow the cycling time of the I.S. machine to be substantially reduced. During the normally wasted time during which the parisons are orbited from the transfer to the takeout station the head can, according to this invention, be engaged with the parison to be carrying out the blow-molding operation.

SPECIFIC DESCRIPTION

Figure 1:
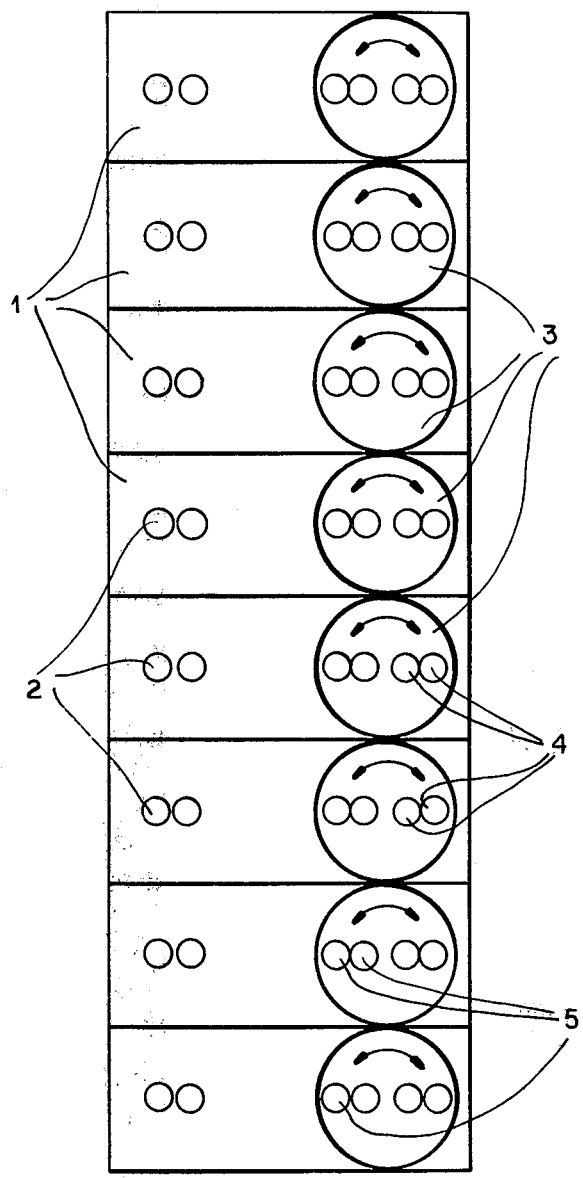
FIG. 1 is a largely schematic top view of the apparatus according to this invention.
Figure 2:
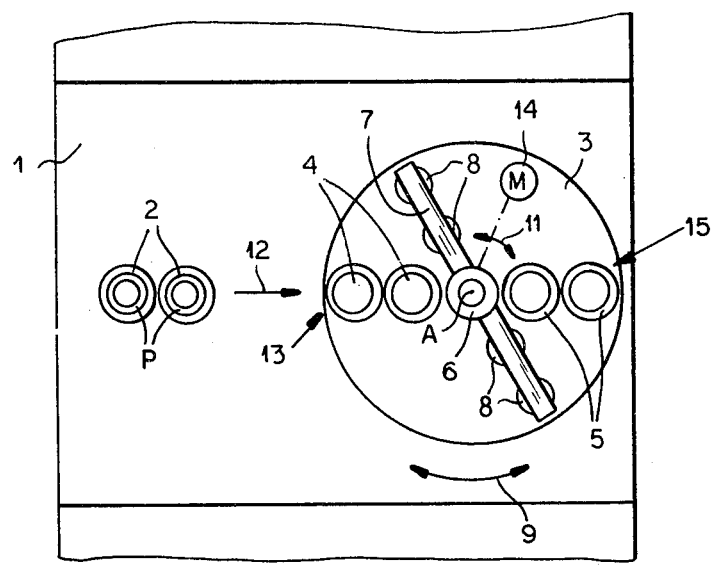
FIG. 2 is a large-scale view of a detail of FIG. 1.

As seen in FIGS. 1 and 2 an I.S. machine according to the instant invention has eight forming stations 1 each provided with a pair of preforms 2 and with a first pair of final molds 4 and an identical second pair of final molds 5. The preform 2 and molds 4 and 5 can be of the 1-, 2-, or 3-part type. Their construction is well known in the art. A transfer device of standard construction, which may be a set of tongs or a neck ring, is indicated schematically at 12 and can serve to displace parisons P from the preforms 2 to both final molds 4 or 5 lying in a transfer station 13 relatively close to the preforms 2.

According to the instant invention the molds 4 and 5 are provided diametrically opposite to each other relative to an axis A on a turntable 3 which can be rotated about the axis A by means of a motor 14 so as to position either the molds 4 or 5 in the transfer station 13 or in a takeout station 15 diametrically opposite thereto. This turntable 3 is carried as seen in FIGS. 1 and 2 on a tubular upright shaft 6 carrying at its upper end an arm 7 extending diametrically in opposite directions from the axis A and carrying at each end a pair of mold heads 8 engageable with the molds 4 or 5 in a manner also known well per se.

Figure 3:
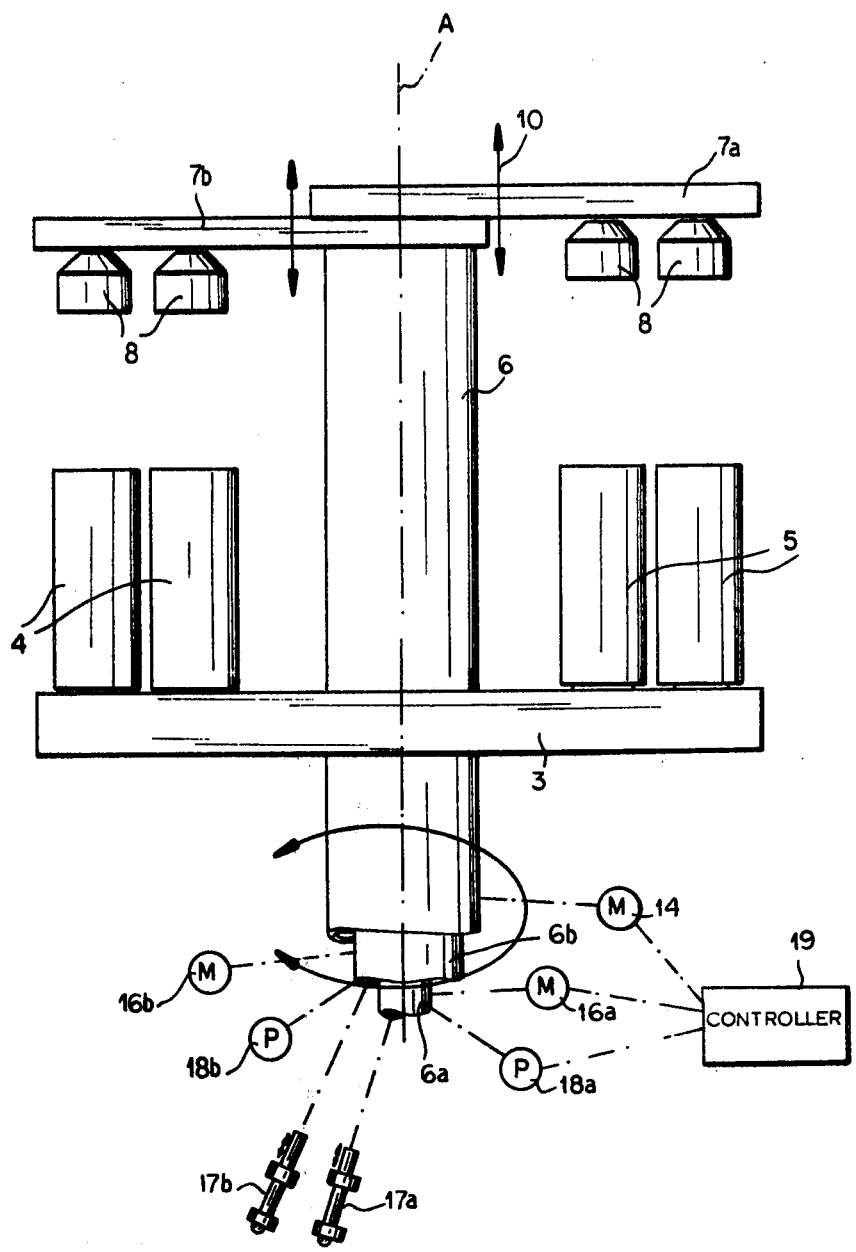
FIG. 3 is a side view of a variation of the apparatus of FIGS. 1 and 2.

It is also possible as shown in FIG. 3 to employ two separate arms 7a and 7b each carrying a respective pair of the mold heads 8. These arms 7a and 7b are in turn carried on respective tube shafts 6a and 6b provided coaxially within the shaft 6. Respective motors 16a and 16b are connected to these shafts 6a and 6b for orbiting the arms 7a and 7b as indicated by arrows 11 in FIG. 2 independently of each other about the axis A. In addition respective hydraulic or pneumatic cylinders 17a and 17b are connected to these shafts 6a and 6b for vertically displacing the arms 7a and 7b, also normally independently of one another. Finally the respective pumps 18a and 18b are connected via the spaces between the tubular shafts 6, 6a, and 6b with the heads 8 for pressurizing them.

A central controller 19 is connected to the various motors 14, 16a, 16b, and cylinders 17a and 17b as well as to the pumps 18a and 18b for operating them synchronously in the manner described below. This controller can be of the simple cam type having a large cam operating a plurality of switches respectively connected to the various motors or via respective valves to the respective cylinders.

According to this invention a pair of gobs are formed in a manner well known per se into parisons P in the preforms 1. They are then lifted out of these preforms 1 by a transfer mechanism indicated schematically at 12 in FIG. 2 and dropped into, for example, the molds 4 in the transfer position 13. The heads 8 of, for instance, the arm 7b are then moved into position above these molds 4 and then are dropped down into position on top of them so that the respective pump 18b can start the blow-molding operation.

The turntable 3 and arm 7b are then jointly rotated about the axis A to displace the molds 4 from the transfer position 13 to the takeout position 15. During this rotation through 180° the blow-molding operation takes place. Once in the position 15 the heads 8 of the arm 7b are moved out of alignment with the molds 4 and the finished blow-molded articles are lifted from the molds 4, which may be split apart to facilitate such removal in a manner well known per se. It is also possible for the heads 8 of the arms 7b to be raised out of engagement with the molds 4 before same are quite displaced into the position 15 and then rotationally arrested, so as to leave the molds 4 clear in the position 15.

Of course, as described in the above-cited copending application, during these operations the arm 7a with its heads 8 and the molds 5 are carrying out a similar operation and are being returned to the transfer position 13.

As a result of the efficient use of the orbiting time from the position 13 to position 15 the overall cycling time of the machine according to this invention can be decreased considerably. This has, of course, correspondingly good effect on the overall operating efficiency of the blow-molding machine.

We claim:
1. An apparatus for making hollow glassware, said apparatus comprising:
at least one stationary preform mold;
a turntable rotatable about an upright axis adjacent said preform mold and having for each preform mold at least two angularly spaced final molds;
means for rotating said turntable about said axis and thereby orbiting each of said final molds through a transfer position close to said preform mold and a takeout position angularly offset from said transfer position and remote from said preform mold;
at least one arm above said turntable and final molds and carrying at least two respective mold heads, said arm being pivotal about said axis with said mold heads vertically alignable with the respective final molds;
means for pivoting said arm and said mold heads about said axis independently of said turntable; and
a source of air at a pressure different from ambient connected to said mold heads.
2. The apparatus defined in claim 1 wherein two such final molds and heads are provided diametrically opposite each other relative to said axis.
3. The apparatus defined in claim 2, further comprising a pivot extending upwardly along said axis through said turntable and having an upper portion carrying said arm.
4. The apparatus defined in claim 3 wherein said pivot is tubular and forms a connection between said heads and said source.
5. The apparatus defined in claim 1 wherein one such arm is provided with said heads diametrically opposite each other an opposite ends of said arm.
6. The apparatus defined in claim 1 wherein said turntable carries two pairs of such final molds with one mold of each pair radially offset from the other mold of the pair, said arm carrying two pairs of such heads.
7. An apparatus for making hollow glassware, said apparatus comprising:
at least one preform mold;
a turntable rotatable about an upright axis adjacent said preform mold and having at least two angularly spaced final molds;
means for rotating said turntable about said axis and thereby orbiting said final molds through a transfer position close to said preform mold and a takeout position angularly offset from said transfer position and remote from said preform mold;
at least two arms above said turntable and final molds and carrying at least two respective mold heads, said arms being pivotal independently of each other about said axis with said mold heads being vertically alignable with the respective final molds;
means for pivoting said arms and the respective mold heads about said axis independently of said turntable; and
a source of air at a pressure different from ambient connected to said mold heads.
8. The apparatus defined in claim 7, further comprising means for vertically displacing said arms relative to each other and to said turntable.

* * * * *